United States Patent
Cai

(10) Patent No.: US 8,423,856 B2
(45) Date of Patent: Apr. 16, 2013

(54) METHOD AND APPARATUS FOR SEMI-PERSISTENT SCHEDULING ACTIVATION DETECTION

(75) Inventor: Zhijun Cai, Irving, TX (US)

(73) Assignee: Research In Motion Limited, Waterloo (CA)

( * ) Notice: Subject to any disclaimer, the term of this patent is extended or adjusted under 35 U.S.C. 154(b) by 424 days.

(21) Appl. No.: 12/748,023

(22) Filed: Mar. 26, 2010

(65) Prior Publication Data

US 2011/0239072 A1 Sep. 29, 2011

(51) Int. Cl.
*G08C 25/02* (2006.01)
*H04L 1/18* (2006.01)

(52) U.S. Cl.
USPC ........... 714/748; 714/807; 714/808; 455/450; 370/329; 370/463

(58) Field of Classification Search .................. None
See application file for complete search history.

(56) References Cited

U.S. PATENT DOCUMENTS

| | | | |
|---|---|---|---|
| 2009/0238128 A1* | 9/2009 | Park et al. | 370/329 |
| 2009/0245194 A1* | 10/2009 | Damnjanovic et al. | 370/329 |
| 2009/0268693 A1 | 10/2009 | Lindh et al. | |
| 2010/0058135 A1* | 3/2010 | Tseng | 714/748 |
| 2010/0081443 A1* | 4/2010 | Meyer et al. | 455/450 |
| 2010/0150091 A1* | 6/2010 | Yu et al. | 370/329 |
| 2010/0169733 A1* | 7/2010 | Kim et al. | 714/748 |
| 2011/0093756 A1* | 4/2011 | Yang et al. | 714/748 |
| 2011/0107169 A1* | 5/2011 | Lohr et al. | 714/748 |
| 2011/0223924 A1* | 9/2011 | Lohr et al. | 455/450 |
| 2011/0299483 A1* | 12/2011 | Wu | 370/329 |
| 2012/0113946 A1* | 5/2012 | Seo et al. | 370/329 |

OTHER PUBLICATIONS

International Search report and the Written Opinion of the International Searching Authority, mailed on Sep. 16, 2011, in corresponding PCT patent application No. PCT/US11/30875.
English translation of pp. 8 and 14 to 17 of U.S Appl. No. 61/226,278, from which US 2012/0113946 to SEo et al. claims priority.

* cited by examiner

*Primary Examiner* — John Trimmings
(74) *Attorney, Agent, or Firm* — Novak Druce Connolly Bove + Quigg LLP

(57) ABSTRACT

A method for activating a semi-persistent scheduled (SPS) resource using a user agent (UA) is presented. A downlink (DL) communication may be received by a UA using a physical downlink control channel (PDCCH). The DL communication may include a control message. When the control message is associated with an SPS Cell-Radio Network Terminal Identifier (C-RNTI) of the UA, the method may include retrieving a value of a New Data Indicator (NDI) field. When the value of the NDI field is equal to 0, the method may include inspecting the control message to determine whether the control message indicates an SPS activation. When the control message indicates an SPS activation, the method may include activating an SPS resource identified by the control message.

20 Claims, 7 Drawing Sheets

METHOD AND APPARATUS FOR SEMI-PERSISTENT SCHEDULING ACTIVATION DETECTION

BACKGROUND

The present invention relates generally to wireless communication devices and more specifically to a method and apparatus for causing a wireless communication device to detect activation of semi-persistent scheduling (SPS) resources.

As used herein, the terms "user agent" and "UA" can refer to wireless devices such as mobile telephones, personal digital assistants (PDAs), handheld or laptop computers, and similar devices that have telecommunications capabilities. In some embodiments, a UA may refer to a mobile, wireless device or other user equipment (UE). The term "UA" may also refer to devices that have similar capabilities but that are not transportable, such as desktop computers, set-top boxes, or network nodes.

In traditional wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" can refer to any component, such as a traditional base station or an LTE eNB (Evolved Node B), that can provide a UA with access to other components in a telecommunications system.

In mobile communication systems such as E-UTRAN, the access device provides radio access to one or more UAs. The access device comprises a packet scheduler for allocating uplink and downlink data transmission resources amongst all the UAs communicating with the access device. The functions of the scheduler include, among others, dividing the available air interface capacity between the UAs, deciding the resources (e.g. sub-carrier frequencies and timing) to be used for each UA's packet data transmission including uplink and downlink, and monitoring packet allocation and system load. The scheduler allocates physical layer resources for downlink shared channel (PDSCH) and uplink shared channel (PUSCH) data transmissions, and sends scheduling information to the UAs through a physical downlink control channel (PDCCH). The UAs refer to the scheduling information for the timing, frequency, data block size, modulation and coding of uplink and downlink transmissions.

Several different downlink control information (DCI) message formats are used to communicate resource assignments to UAs including, among others, a DCI format 0 for specifying uplink resources and DCI formats 1, 1A, 2 and 2A for specifying downlink resources. Uplink-specifying DCI format 0 includes several DCI fields, each of which includes information for specifying a different aspect of allocated uplink resources. Exemplary DCI format 0 DCI fields include a transmit power control (TPC) field, a cyclic shift demodulation reference signal (DM-RS) field, a modulating coding scheme (MCS) and redundancy version field, a New Data Indicator (NDI) field, a resource block assignment field and a hopping flag field. The NDI field may be a single bit field that has a value of either 0 or 1. If the DCI message indicates that new data is to be transferred using an established resource, the value of the NDI field may be toggled (i.e., from 0 to 1, and vice versa) from its previous value. By toggling the value of the NDI field, the DCI message indicates to the UA that new data is being transferred.

The downlink specifying DCI formats 1, 1A, 2 and 2A each include several DCI fields that include information for specifying different aspects of allocated downlink resources. Exemplary DCI format 1, 1A, 2 and 2A DCI fields include a Hybrid Automatic Repeat reQuest (HARQ) process number field, an MCS field, a New Data Indicator (NDI) field, a resource block assignment field and a redundancy version field. Each of the DCI formats 0, 1, 2, 1A and 2A includes additional fields for specifying allocated resources. The access device selects one of the downlink DCI formats for allocating resources to a UA as a function of several factors including UA and access device capabilities, the amount of data a UA has to transmit, the amount of communication traffic within a cell, etc.

After a DCI formatted massage is generated, an access device may generate a cyclic redundancy check (CRC) for the message and append the CRC to the DCI formatted message. Next, the access device may use a Cell-Radio Network Terminal Identifier (C-RNTI) or Semi-Persistent Scheduling Radio Network Terminal Identifier (SPS-RNTI) that is uniquely associated with a UA to scramble the CRC prior to transmitting the message to the UA. When the message is received at the UA, the UA calculates the CRC from the received message, uses the C-RNTI or SPS-RNTI to scramble the CRC and uses the scrambled CRC to ascertain whether the message was received accurately. If the CRC check indicates that the message was not intended for the UA (i.e. the CRC derived at the UA does not match the CRC attached to the received message), the UA may ignore the message.

In communications between an access device and a UA, HARQ is a scheme for re-transmitting a traffic data packet to compensate for an incorrectly received traffic packet. A HARQ scheme is used both in uplink and downlink transmissions in LTE systems. Take downlink transmissions for example. For each downlink packet received by a UA, a positive acknowledgment (ACK) is transmitted on a Physical Uplink Control Channel (PUCCH) from the UA to the access device after a cyclic redundancy check (CRC) performed by the UA indicates a successful decoding. If the CRC indicates a packet is not received correctly, a UA HARQ entity transmits a negative acknowledgement (NACK) on the PUCCH in order to request a retransmission of the erroneously received packet. Once a HARQ NACK is transmitted to an access device, the UA waits to receive a retransmitted traffic data packet. When the HARQ NACK is received at an access device, the access device retransmits the incorrectly received packet to the UA. This process of transmitting, ACK/NACK and retransmitting continues until either the packet is correctly received or a maximum number of retransmissions has been reached.

Whenever control information has to be transmitted between an access device and a UA, the resources required to complete that transmission cannot be used to transmit other information such as voice or application information and data. For this reason, it is important to minimize the amount of control data required for controlling communications between an access device and a UA.

Two general types of communication scheduling for minimizing control data include persistent and semi-persistent scheduling. In persistent scheduling, as the label implies, communication resources are pre-allocated for a specific UA until released regardless of whether the resources remain in use during an entire scheduled period. For simple persistent scheduling, persistently scheduled resources are not available to other UAs for communication, even when the UA to which the persistent resource is assigned does not use the resource.

In semi-persistent scheduling (SPS), however, a resource may be assigned to a UA and used on an on-going basis until the access device decides to stop using the resource and instructs the UA to stop using the resource. Thus, for example, in the case of Voice over Internet Protocol (VoIP), a typical communication sequence may include interleaved "talk spurt states" and "silence states" where data corresponding to a UA user's speech is communicated during talk spurt states and no data except comfort noise information is communicated during silence states.

In some implementations, for example, during a talk spurt state, VoIP packets arrive at a fixed rate such as one packet every 20 ms with only minimal variation in packet size. In that case, SPS activation may be used to assign reoccurring downlink and uplink SPS resources (e.g., as an initial grant) during the talk spurt state. During times of UA inactivity (e.g., silence states), however, the allocated uplink and downlink resources associated with a UA may be released so that the resources can be allocated to other UAs. As such, the uplink and downlink resources are persistently allocated only in the sense that the resources remain allocated at long as the resources are being actively used to communicate information. Once resource use ceases, the resources may be released. After the resources are released, when a next talk spurt is to occur, the access device transmits one or more additional DCI formatted messages to the UA to commence a new SPS resource allocation to support the next spurt. Hereafter the phrase "SPS resources" can be used to refer to resources that are semi-persistently scheduled. In order to control SPS resource assignment, SPS-RNTI is used.

In LTE, SPS activation signaling can be made using the PDCCH to initialize an SPS resource. Conversely, SPS release signaling is used to release the SPS resources, and may also be made using the PDCCH. When the PDCCH is used for SPS activation signaling or SPS release signaling, the PDCCH signaling may carry fields that are set to fixed bits to reduce a false alarm probability of the SPS activation and/or release messages. These fixed-value fields act as a redundancy check or checksum and may be referred to as a "Virtual CRC." In the case of SPS resource allocation, the communication industry has settled on ways to activate and reconfigure SPS resources. Unfortunately, the industry has not developed a reliable way to cause a UA to activate SPS resources that prevents improper allocation of resources when a control channel message is incorrectly received by a UA resulting in a 'false-alarm' condition.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
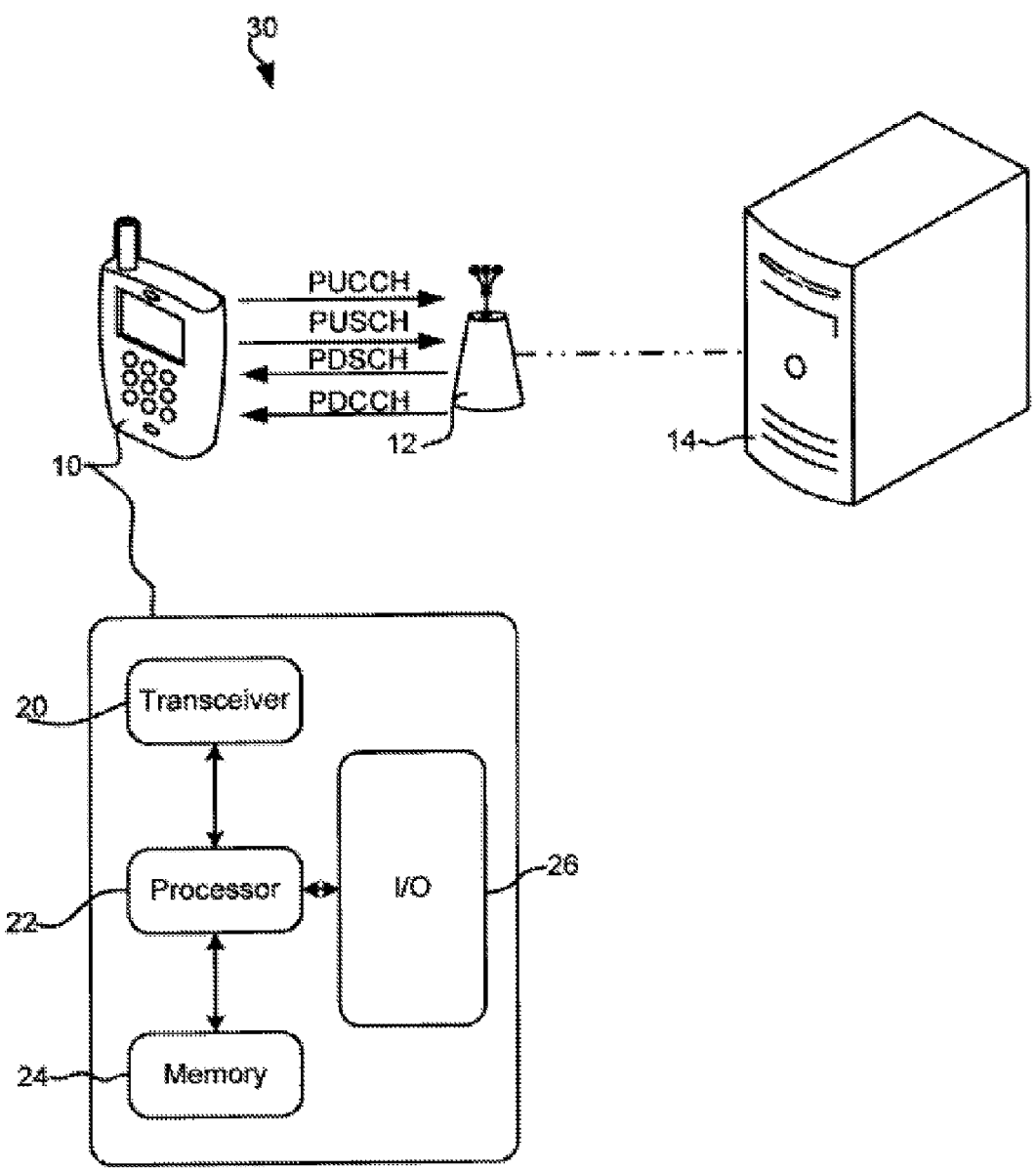
FIG. 1 is an illustration of a wireless communications system including a user agent (UA), an access device and a server.

The present invention relates generally to wireless communication devices and more specifically to a method and apparatus for causing a wireless communication device to detect activation of semi-persistent scheduling (SPS) resource allocation.

Some implementations include a method for activating a semi-persistent scheduled (SPS) resource using a user agent (UA). The method comprises receiving a downlink (DL) communication using a physical downlink control channel (PDCCH). The DL communication includes a control message. The method includes, when the control message is associated with an SPS Cell-Radio Network Terminal Identifier (C-RNTI) of the UA, retrieving a value of a New Data Indicator (NDI) field. The method includes, when the value of the NDI field is equal to 0, inspecting the control message to determine whether the control message indicates an SPS activation. The method includes, when the control message indicates an SPS activation, activating an SPS resource identified by the control message.

Other implementations include a method for activating a semi-persistent scheduled (SPS) resource using a user agent (UA). The method includes receiving a control message, and, when the control message is associated with a semi-persistent scheduling identifier of the UA, inspecting the control message to determine whether the control message indicates an SPS activation. The method includes, when the control message indicates an SPS activation, activating an SPS resource identified by the control message.

Other implementations include a user agent (UA) for activating a semi-persistent scheduled (SPS) resource. The UA includes a processor configured to perform the step of receiving a downlink (DL) communication using a physical downlink control channel (PDCCH). The DL communication includes a control message. The processor is further configured to perform the step of, when the control message is associated with an SPS Cell-Radio Network Terminal Identifier (C-RNTI) of the UA, retrieving a value of a New Data Indicator (NDI) field. The processor is configured to perform the step of, when the value of the NDI field is equal to 0, inspecting the control message to determine whether the control message indicates an SPS activation. The processor is configured to perform the step of, when the control message indicates an SPS activation, activating an SPS resource identified by the control message.

Other implementations include a user agent (UA) for activating a semi-persistent scheduled (SPS) resource. The UA includes a processor configured to perform the steps of receiving a control message, and, when the control message is associated with a semi-persistent scheduling identifier of the UA, inspecting the control message to determine whether the control message indicates an SPS activation. The processor is configured to perform the step of, when the control message indicates an SPS activation, activating an SPS resource identified by the control message.

To the accomplishment of the foregoing and related ends, the disclosure, then, comprises the features hereinafter fully described. The following description and the annexed drawings set forth in detail certain illustrative aspects of the invention. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Referring now to the drawings wherein like reference numerals correspond to similar elements throughout the several views and, more specifically, referring to FIG. 1, FIG. 1 illustrates a communication system that includes a user agent (UA) 10, an access device 12 and a server 14. UA 10 includes a processor 22, a transceiver 20, a memory 24 and input/output (I/O) devices collectively identified by numeral 26. Memory 24 stores programs that are run by processor to perform various communication functions including the functions that are described herein and that comprise the present disclosure. I/O 26 may include a display screen, a microphone, a speaker, input keys on a phone or portable computer, etc.

UA 10 communicates with access device 12 (i.e., an evolved Node B (eNB)) via various uplink and downlink communication channels. While UAs and access devices use many different channels to facilitate communications, to simplify this explanation, only four channels are illustrated including a physical downlink control channel (PDCCH), a physical uplink control channel (PUCCH), and various shared channels including a physical downlink shared channel (PDSCH) and a physical uplink shared channel (PUSCH).

Access device 12 hosts a plurality of functions including but not limited to radio resource management including radio bearer control, radio admission control, connection mobility control, dynamic allocation of resources to UAs in both uplink and downlink scheduling, IP header compression and encryption of user data stream, scheduling and transmission of broadcast information and measurement and measurement reporting configuration for mobility and scheduling.

Referring still to FIG. 1, access device 12 may be configured to take steps to activate and release semi-persistent scheduled or scheduling (SPS) communication resources for any of several different reasons. For instance, in some cases a UA 10 may initiate a constant-rate service such as Voice over Internet Protocol (VoIP) that results in a regular, predictable transmission of data from UA 10 to the access device. In that case, the access device may use an SPS grant to minimize control channel loading and to allow for constant-rate communications between the access device and UA 10.

Where some event occurs that causes access device 12 to grant SPS resources, consistent with at least some embodiments of the present disclosure, access device 12 may be programmed to generate a message or data packet to be transmitted to UA 10 that will be recognized by the UA as a signal that the UA 10 should initiate the SPS resources. Generally, for a given UA, the SPS allocation will be associated with the UA's SPS-RNTI, as described above.

In existing networks compliant with the 3rd Generation Partnership Project (3GPP) Technical Specifications (TS) 36.321 version 8.8.0, to receive SPS activation/release signaling, a UA implements the following steps: The UA first detects whether a received PDCCH grant (e.g., included within a control message) is addressed to the UA's SPS-RNTI. If the received grant is addressed the UA's SPS-RNTI, the UA then checks whether the NDI contained in the PDCCH grant is set to a value of 0. If the NDI has a value of 0, the UA is configured to check the PDCCH content to determine whether the PDCCH content includes an SPS release. If the content includes an SPS release, the identified resources are released. If the PDCCH content does not include an SPS release, the UA treats the PDCCH grant as an SPS activation and initiates the identified resources.

Accordingly, when the UA receives a resource grant message on the PDCCH for the UA's SPS-RNTI, and if the NDI of the uplink grant is set to 0, the UA is configured to take particular actions. If the PDCCH grant contents indicate SPS release, the UA is configured to clear the configured uplink grant if any such grant exists. Otherwise, the UA is configured to simply presume that the PDCCH grant is for SPS activation. Accordingly, if the PDCCH grant contents do not explicitly indicate SPS release, the UA implicitly presumes the grant includes an SPS activation and will always store the uplink grant and the associated HARQ information as a configured uplink grant, initialize (if not active) or re-initialize (if already active) the configured uplink grant to start in this transmission time interval (TTI) and to reoccur according to predefined rules, consider the NDI bit to have been toggled, and deliver the configured uplink grant and the associated HARQ information to the HARQ entity for this TTI. This may also be true for downlink SPS activation. Here, uplink SPS activation is described only as an example.

This implementation, however, can result in false-alarm errors. In the false alarm condition, the UA receives a UL grant having the UA's SPS-RNTI, and detects that the NDI value of the grant has been set to 0. If the message neither indicates an SPS activation nor an SPS release, the UA will always presume the grant is for an SPS activation and will unnecessarily allocate resources accordingly. The problem results because existing network implementations only consider the NDI bits and SPS-RNTI of a UL grant to detect SPS activation signaling and do not require that a UA explicitly verify that a particular grant is for SPS activation.

For example, a UA receives a downlink PDCCH grant using DCI format 1. The UA's SPS-RNTI is matched by the PDCCH grant and the grant has an NDI value of 0. In the received PDCCH grant, however, the encoded modulation and coding scheme (MCS) is incorrectly received as "11000". As such, the UA determines that the grant is not for SPS release, as an SPS release grant would require an MCS value of "11111". In response, current network standards (3GPP TS 36.321) automatically presume that the received PDCCH grant is for SPS activation signaling. The grant, however, is not for SPS activation signaling, as that would require the MSB (Most Significant Bit) of the MCS to be "0". Accordingly, in this example, the UA falsely detects SPS activation. The UA will then go on to use the falsely-detected SPS activation signaling to activate SPS resources according to the current MAC specification (TS 36.321) possibly incurring significant performance degradation and unnecessary use of resources. Similar false alarms may occur, for example, when the MCS value received by the UA is "10100" or other combinations of binary numbers having an MSB of 1. Similarly, many other examples could happen for other fields such as redundancy version field, etc.

As such, a particular PDCCH grant targeted to a particular UA's SPS-RNTI may include an NDI having a value of 0, but can describe three scenarios: an SPS release; an SPS activation; or neither SPS release nor SPS activation. However, as described above, if a PDCCH grant does not include an SPS release, a UA is configured to automatically consider both the second and third scenarios (i.e., a grant indicating either an activation, or neither an activation nor a release) as SPS activations, significantly increasing false positives. For example, considering the virtual CRC is 6 bits for frequency division duplexing (FDD), the probability of the false positive may be increased by 2^6 times, or by 64 times, possibly resulting in severe performance degradation for SPS activation.

Accordingly, to mitigate these problems, in the present system, the UA is configured to implement a preliminary SPS activation condition check before the UA enters an SPS activation procedure. The preliminary SPS activation condition check is used to minimize the false alarm conditions described above that would otherwise resulting in a UA attempting to initialize resources that have not, in fact, been allocated to the UA. The present system is configured to mitigate errors in assignments or grants of both uplink and downlink communication resources.

In downlink communications, assignments transmitted on the PDCCH are used to indicate whether there is a transmission on a downlink shared channel (DL-SCH) for a particular UA. The assignments include the relevant HARQ information for use of the resources by the UA. Exemplary HARQ information includes a New Data Indicator (NDI), and Transport Block (TB) size. For DL-SCH transmissions, the HARQ information may also include a HARQ process ID. For uplink shared channel (UL-SCH) transmission, the HARQ information may also include a Redundancy Version (RV). In the case of spatial multiplexing on DL-SCH, the HARQ information may include a set of NDI and TB size for each transport block When operating in accordance with the present disclosure, if a UA receives a downlink assignment for a particular TTI using the PDCCH, and the downlink assignment is for the UA's Semi-Persistent Scheduling C-RNTI, the UA may be configured to consider the NDI not to have been toggled if the NDI in the received HARQ information is equal to 1. The UA may also indicate the presence of a downlink assignment and deliver the associated HARQ information to the HARQ entity for this TTI.

If, however, the NDI in the received HARQ information is 0, the UA is configured to clear the configured downlink assignment (if any) if the PDCCH contents indicate SPS release, and, if timeAlignmentTimer is running, indicate a positive acknowledgement for the downlink SPS release to the physical layer. Otherwise, in the present system, if, and only if, the PDCCH contents indicate SPS activation, the UA is then configured to store the downlink assignment and the associated HARQ information as a configured downlink assignment, initialize (if not active) or re-initialize (if already active) the configured downlink assignment to start in this TTI and to recur according to pre-existing rules, set the HARQ Process ID to the HARQ Process ID associated with this TTI, consider the NDI bit to have been toggled, and indicate the presence of a configured downlink assignment and deliver the stored HARQ information to the HARQ entity for this TTI.

Accordingly, in the present implementation, before initiating the SPS resource, the UA is configured to inspect the PDCCH contents to verify that the contents do, in fact, indicate an SPS initiation (e.g., by verifying that the MSB of the MCS received within the PDCCH contents has a value of 0). The additional step of inspecting and verifying the contents of the PDCCH grant mitigate the false-alarm conditions describe above to prevent the UA from inappropriately initiating SPS resources.

For downlink assignments received on the PDCCH for the UA's Semi-Persistent Scheduling C-RNTI and for configured downlink assignments, the HARQ Process ID associated with this TTI may be derived from the following equation:

$$\text{HARQ Process ID} = [\text{floor}(\text{CURRENT\_TTI}/(\text{Downlink Semi-Persistent Scheduling Interval}))] \text{ modulo Number of Configured SPS Processes} \quad \text{Equation (1)}$$

In equation (1), CURRENT_TTI=[(SFN*10)+subframe number], 'Downlink Semi-Persistent Scheduling Interval' is the periodicity of semi-persistent scheduling signaled via RRC, and 'Number of Configured SPS Processes' is the number of HARQ processes allocated for semi-persistent scheduling signaled via RRC.

When the UA needs to read the BCCH, the UA may, based on the scheduling information from RRC, if a downlink assignment for this TTI has been received on the PDCCH for the SI-RNTI and if the redundancy version is not defined in the PDCCH format, indicate a downlink assignment and redundancy version for the dedicated broadcast HARQ process to the HARQ entity for this TTI. The redundancy version of the received downlink assignment for this TTI may be determined by RVK=ceiling(3/2*k) modulo 4, where k depends on the type of system information message: for SystemInformationBlockType1 message, k=(SFN/2) modulo 4, where SFN is the system frame number; for System Information messages, k=i modulo 4, i=0, 1, . . . , nsw−1, where i denotes the subframe number within the SI window nsw.

Figure 2:
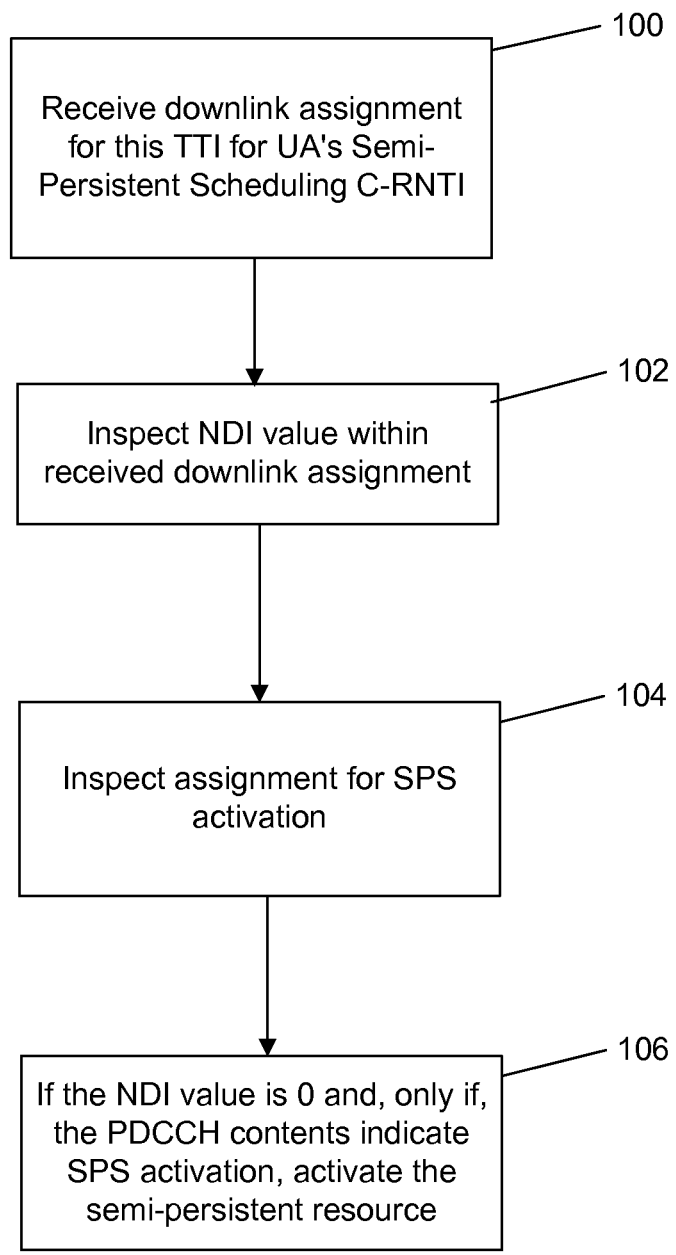
FIG. 2 is a flowchart illustrating an exemplary method in accordance with the present disclosure for processing a DL assignment for SPS resources where the assignment is for a UA's SPS C-RNTI.

FIG. 2 is a flowchart illustrating an exemplary method in accordance with the present disclosure for processing a DL assignment for SPS resources where the assignment is for a UA's SPS C-RNTI. In step 100, a downlink assignment for this TTI is received by a UA on the PDCCH for the UA's Semi-Persistent Scheduling C-RNTI. The downlink assignment may be encoded within a control message, for example. In step 102, after receiving the downlink assignment, the UA inspects the downlink assignment to retrieve an NDI value therefrom. If the NDI value is set to 1, the UA is configured to consider the NDI not to have been toggled, and to indicate the presence of a downlink assignment and deliver the associated HARQ information to the HARQ entity for this TTI.

If, however, the NDI value is set to 0 and the PDCCH contents indicate SPS release, the UA is configured to clear the configured downlink assignment (if any) and, if time-AlignmentTimer is running, indicate a positive acknowledgement for the downlink SPS release to the physical layer. If, however, the assignment is not for SPS release, the UA is configured to inspect the assignment to determine whether the assignment is for SPS activation in step 104. For example, in one implementation the UA inspects the MSB (Most Significant Bit) of the MCS of the assignment. If the MSB is set to "0", the UA may consider the assignment to be for SPS activation.

In step 106, only if the assignment is for SPS activation, the UA is configured activate the identified semi-persistent downlink resource. For example, in one implementation, the UA is configured to store the downlink assignment and the associated HARQ information as configured downlink assignment, initialize (if not active) or re-initialize (if already active) the configured downlink assignment to start in this TTI and to recur according to predetermined rules, set the HARQ Process ID to the HARQ Process ID associated with this TTI, consider the NDI bit to have been toggled, and indicate the presence of a configured downlink assignment and deliver the stored HARQ information to the HARQ entity for this TTI.

The present system may also be configured to facilitate activation of a resource based upon an SPS uplink grant for a particular UA. To transmit on the UL-SCH the UA requires a valid uplink grant (except for non-adaptive HARQ retransmissions) which may be received dynamically on the PDCCH or in a Random Access Response or which may be configured semi-persistently. To perform requested transmissions, the MAC layer receives HARQ information from lower layers.

In accordance with the present disclosure, if an uplink grant for this TTI has been received on the PDCCH for the UA's Semi-Persistent Scheduling C-RNTI, and if the NDI in the received HARQ information is 1, the UA may be configured to consider the NDI not to have been toggled, and deliver the uplink grant and the associated HARQ information to the HARQ entity for this TTI.

If, however, the NDI in the received HARQ information is 0 and if PDCCH contents indicate SPS release, the UA is configured to clear the configured uplink grant (if any). Otherwise, if, and only if, the PDCCH contents indicate SPS activation, the UA is configured to activate the identified resource. For example, the UA may store the uplink grant and the associated HARQ information as configured uplink grant, initialize (if not active) or re-initialize (if already active) the configured uplink grant to start in this TTI and to recur according to predetermined rules, consider the NDI bit to have been toggled, and deliver the configured uplink grant and the associated HARQ information to the HARQ entity for this TTI.

In the present implementation, before initiating the SPS resource, the UA is configured to inspect the PDCCH contents to verify that the contents do, in fact, indicate an SPS initiation (e.g., by verifying that the MSB of the MCS received within the PDCCH contents has a value of 0). The additional step of inspecting and verifying the contents of the PDCCH grant mitigate the false-alarm conditions describe above to prevent the UA from inappropriately initiating SPS resources.

In some implementations, the period of configured uplink grants is expressed in TTIs. If the UA receives both a grant in a Random Access Response and a grant for its C-RNTI or Semi persistent scheduling C-RNTI requiring transmissions in the same UL subframe, the UA may choose to continue with either the grant for the UA's RA-RNTI or the grant for its C-RNTI or Semi persistent scheduling C-RNTI. Also, when a configured uplink grant is indicated during a measurement gap and indicates a UL-SCH transmission during a measurement gap, the UA processes the grant but may not transmit on the UL-SCH.

Figure 3:
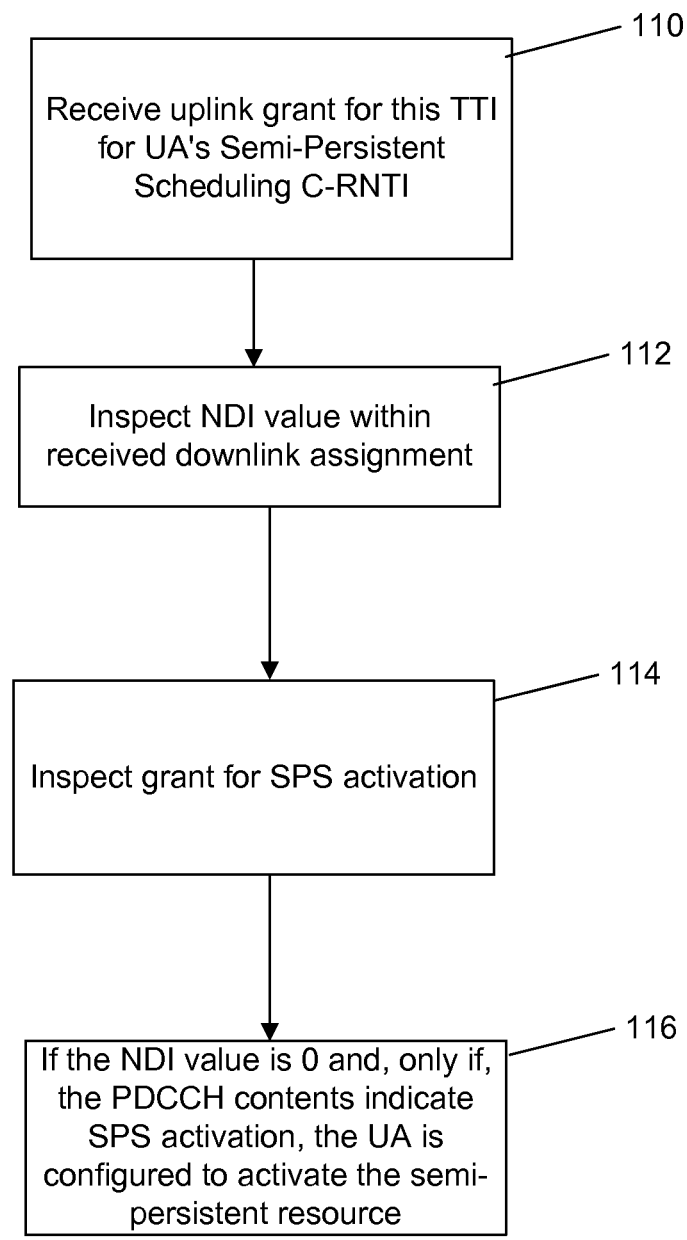
FIG. 3 is a flowchart illustrating an exemplary method for processing a UL grant for SPS resources where the grant is for a UA's SPS C-RNTI.

FIG. 3 is a flowchart illustrating an exemplary method for processing a UL grant for SPS resources where the grant is for a UA's SPS C-RNTI. In step 110, an uplink grant for this TTI is received by a UA on the PDCCH for the UA's Semi-Persistent Scheduling C-RNTI. The grant may be encoded within a control message, for example. In step 112, after receiving the uplink grant, the UA inspects the HARQ information encoded in the uplink grant to retrieve an NDI value. If the NDI value is set to 1, the UA is configured to consider the NDI not to have been toggled, and to deliver the uplink grant and the associated HARQ information to the HARQ entity for this TTI.

If the NDI value is set to 0 and the grant contents indicate SPS release, the UA is configured to clear the configured uplink assignment (if any). If, however, the grant is not for SPS release, the UA is configured to inspect the grant to determine whether the grant is for SPS activation in step 114. For example, in one implementation, the UA inspects the MSB (Most Significant Bit) of the MCS of the grant. If the MSB is set to "0", the UA may consider the grant to be for SPS activation.

In step 116, if the NDI value is 0 and the grant is not for SPS release, the UA, only if the grant indicates SPS activation, is configured to activate the identified semi-persistent uplink resource. For example, in one implementation, the UA is configured to store the uplink grant and the associated HARQ information as configured uplink grant, initialize (if not active) or re-initialize (if already active) the configured uplink grant to start in this TTI and to recur according to predetermined rules, consider the NDI bit to have been toggled, and deliver the configured uplink grant and the associated HARQ information to the HARQ entity for this TTI.

Figure 4:
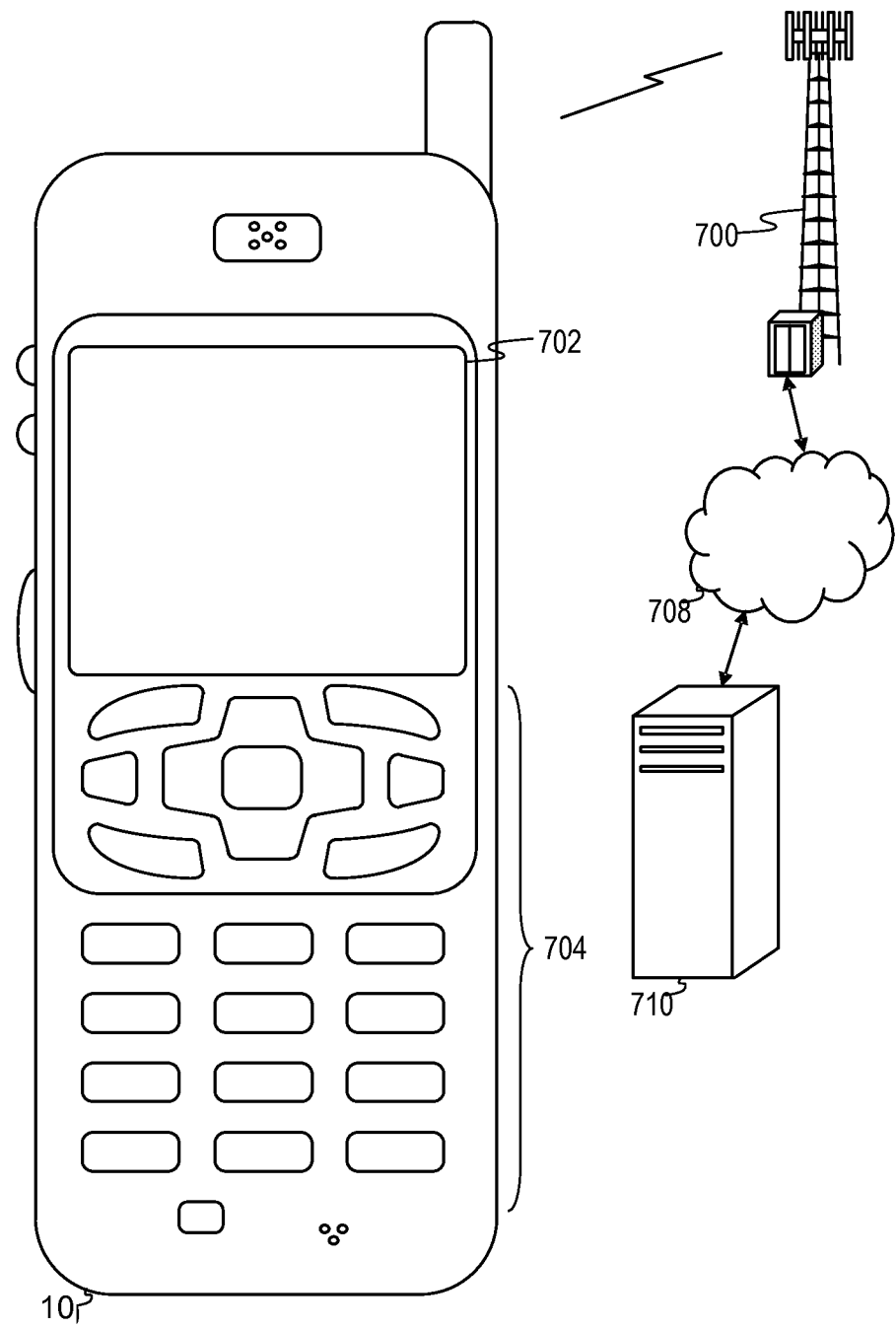
FIG. 4 is an illustration of a wireless communication system including a user agent (UA) operable for some of the various embodiments of the disclosure.

FIG. 4 illustrates a wireless communications system including an exemplary embodiment of UA 10. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 5:
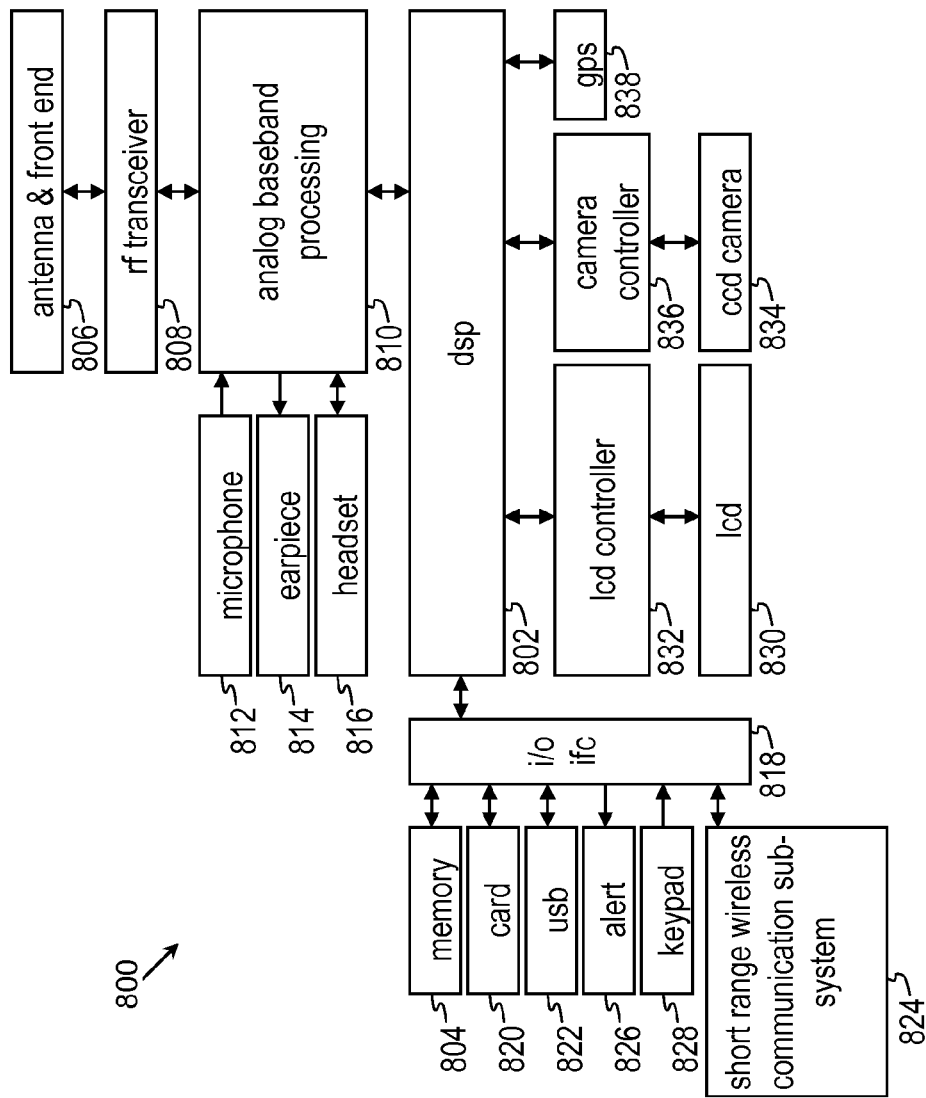
FIG. 5 is an illustration of a UA operable for the some of the various embodiments of the disclosure.

FIG. 5 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 6:
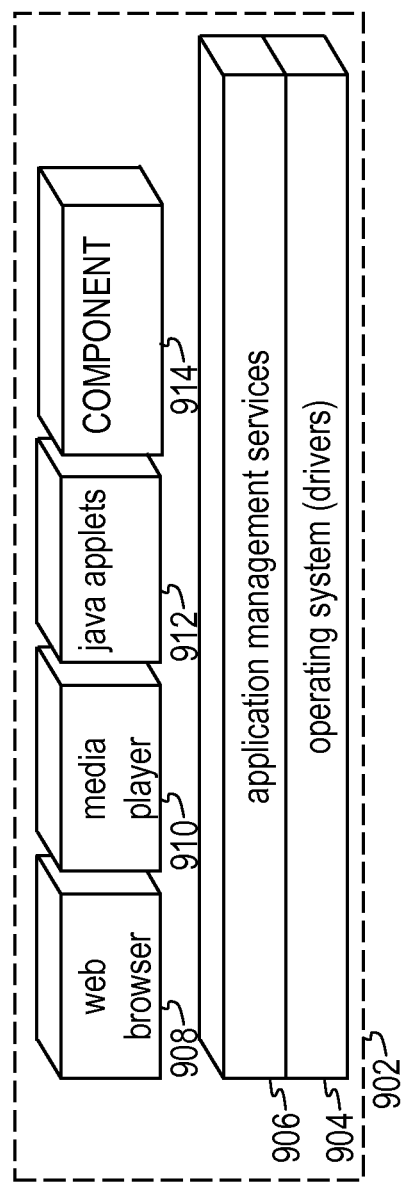
FIG. 6 is an illustration of a software environment that may be implemented on a UA operable for some of the various embodiments of the disclosure.

FIG. 6 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 6 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 7:
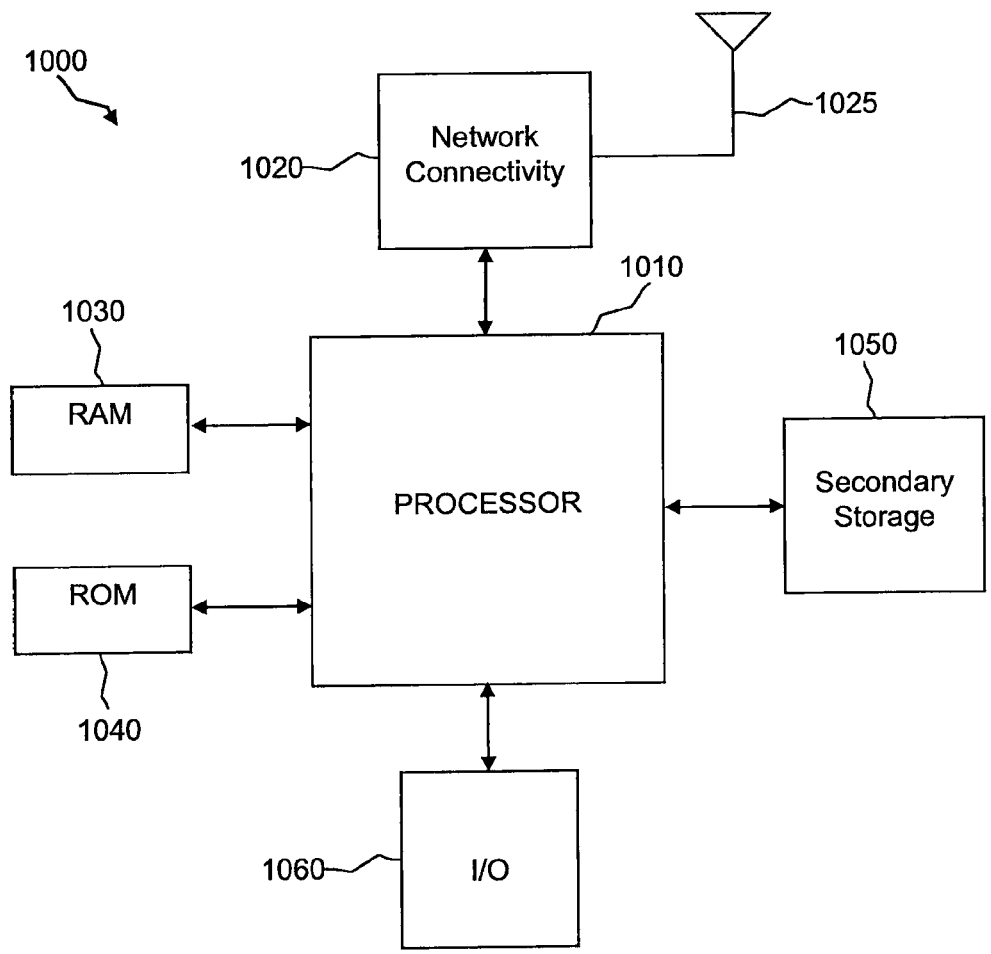
FIG. 7 is an illustration of a general purpose computer system suitable for some of the various embodiments of the disclosure.

The UA 10, access device 120, and other components described above might include a processing component that is capable of executing instructions related to the actions described above. FIG. 7 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

To apprise the public of the scope of this invention, the following claims are made:

What is claimed is:

1. A method for activating a semi-persistent scheduled (SPS) resource using a user agent (UA), comprising:
   receiving a downlink (DL) communication using a physical downlink control channel (PDCCH), the DL communication including a control message;
   when the control message is associated with an SPS Cell-Radio Network Terminal Identifier (C-RNTI) of the UA, retrieving a value of a New Data Indicator (NDI) field;
   when the value of the NDI field is equal to 0, inspecting the control message to determine whether the control message indicates an SPS activation; and
   when the control message indicates an SPS activation, activating an SPS resource identified by the control message.

2. The method of claim 1, including, when the control message indicates an SPS activation including a downlink (DL) assignment, storing the DL assignment and associated Hybrid Automatic Repeat reQuest (HARQ) information as a configured DL assignment.

3. The method of claim 1, including, when the control message indicates an SPS activation including an uplink (UL) assignment, storing the UL assignment and associated Hybrid Automatic Repeat reQuest (HARQ) information as a configured UL grant.

4. The method of claim 1, including using the SPS C-RNTI to decode the control message from at least a portion of the DL communication.

5. The method of claim 4, including:
   identifying a cyclic redundancy check (CRC) value of the control message; and
   confirming that the CRC is accurate.

6. A method for activating a semi-persistent scheduled (SPS) resource using a user agent (UA), comprising:
   receiving a control message;
   when the control message is associated with a semi-persistent scheduling identifier of the UA, inspecting the control message to determine whether the control message indicates an SPS activation; and
   when the control message indicates an SPS activation, activating an SPS resource identified by the control message.

7. The method of claim 6, including, when the control message indicates an SPS activation including a downlink (DL) assignment, storing the DL assignment and associated Hybrid Automatic Repeat reQuest (HARQ) information as a configured DL assignment.

8. The method of claim 6, including, when the control message indicates an SPS activation including an uplink (UL) assignment, storing the UL assignment and associated Hybrid Automatic Repeat reQuest (HARQ) information as a configured UL grant.

9. The method of claim 6, including using an SPS Cell-Radio Network Terminal Identifier (C-RNTI) to decode the control message.

10. The method of claim 9, including:
    identifying a cyclic redundancy check (CRC) value of the control message; and
    confirming that the CRC is accurate.

11. A user agent (UA) for activating a semi-persistent scheduled (SPS) resource, comprising:
    a processor configured to perform the steps of:
        receiving a downlink (DL) communication using a physical downlink control channel (PDCCH), the DL communication including a control message;
        when the control message is associated with an SPS Cell-Radio Network Terminal Identifier (C-RNTI) of the UA, retrieving a value of a New Data Indicator (NDI) field;
        when the value of the NDI field is equal to 0, inspecting the control message to determine whether the control message indicates an SPS activation; and
        when the control message indicates an SPS activation, activating an SPS resource identified by the control message.

12. The UA of claim 11, wherein the processor is further configured to perform the step of, when the control message indicates an SPS activation including a downlink (DL) assignment, storing the DL assignment and associated Hybrid Automatic Repeat reQuest (HARQ) information as a configured DL assignment.

13. The UA of claim 11, wherein the processor is further configured to perform the step of, when the control message indicates an SPS activation including an uplink (UL) assignment, storing the UL assignment and associated Hybrid Automatic Repeat reQuest (HARQ) information as a configured UL grant.

14. The UA of claim 11, wherein the processor is further configured to perform the step of using the SPS C-RNTI to decode the control message from at least a portion of the DL communication.

15. The UA of claim 14, wherein the processor is further configured to perform the steps of:
identifying a cyclic redundancy check (CRC) value of the control message; and
confirming that the CRC is accurate.

16. A user agent (UA) for activating a semi-persistent scheduled (SPS) resource, comprising:
a processor configured to perform the steps of:
receiving a control message;
when the control message is associated with a semi-persistent scheduling identifier of the UA, inspecting the control message to determine whether the control message indicates an SPS activation; and
when the control message indicates an SPS activation, activating an SPS resource identified by the control message.

17. The UA of claim 16, wherein the processor is further configured to perform the step of, when the control message indicates an SPS activation including a downlink (DL) assignment, storing the DL assignment and associated Hybrid Automatic Repeat reQuest (HARQ) information as a configured DL assignment.

18. The UA of claim 16, wherein the processor is further configured to perform the step of, when the control message indicates an SPS activation including an uplink (UL) assignment, storing the UL assignment and associated Hybrid Automatic Repeat reQuest (HARQ) information as a configured UL grant.

19. The UA of claim 16, wherein the processor is further configured to perform the step of using an SPS Cell-Radio Network Terminal Identifier (C-RNTI) to decode the control message.

20. The UA of claim 19, wherein the processor is further configured to perform the steps of:
identifying a cyclic redundancy check (CRC) value of the control message; and
confirming that the CRC is accurate.

* * * * *